(12) United States Patent
de Macedo

(10) Patent No.: US 12,737,457 B2
(45) Date of Patent: Sep. 15, 2026

(54) MACHINE LEARNING PROCESS DETECTION

(71) Applicant: Hewlett-Packard Development Company, L.P., Spring, TX (US)

(72) Inventor: Augusto Queiroz de Macedo, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 153 days.

(21) Appl. No.: 18/571,153

(22) PCT Filed: Jul. 23, 2021

(86) PCT No.: PCT/US2021/042914

§ 371 (c)(1),
(2) Date: Dec. 15, 2023

(87) PCT Pub. No.: WO2023/003567

PCT Pub. Date: Jan. 26, 2023

(65) Prior Publication Data

US 2024/0281528 A1 Aug. 22, 2024

(51) Int. Cl.
*G06F 21/55* (2013.01)

(52) U.S. Cl.
CPC .................................. *G06F 21/554* (2013.01)

(58) Field of Classification Search
None
See application file for complete search history.

(56) References Cited

U.S. PATENT DOCUMENTS 9,021,589 B2 4/2015 Anderson et al.
9,349,103 B2 5/2016 Eberhardt, III et al.
10,817,604 B1 * 10/2020 Kimball ................ G06F 21/563
10,826,931 B1 * 11/2020 Quan .................. H04L 63/1441
12,314,385 B1 * 5/2025 Beauchesne ............ G06F 21/52
2010/0205673 A1 * 8/2010 Burrell .................. G06F 21/577 726/25
2014/0237595 A1 * 8/2014 Sridhara ............... G06F 21/566 709/224
2016/0078362 A1 * 3/2016 Christodorescu ...... G06N 20/10 706/12
2016/0253498 A1 * 9/2016 Valencia ................ G06N 20/00 726/23
2016/0275289 A1 * 9/2016 Sethumadhavan .......................... H04L 63/0428
2016/0330223 A1 * 11/2016 Sridhara ............... G06F 21/566
2016/0379136 A1 * 12/2016 Chen ..................... G06F 21/552 706/14
2017/0024660 A1 * 1/2017 Chen ...................... G06N 5/045
2018/0025157 A1 1/2018 Titonis et al.
(Continued)

*Primary Examiner* — Christopher C Harris
(74) *Attorney, Agent, or Firm* — Quarles & Brady LLP

(57) ABSTRACT

In some examples, the disclosure describes a device, comprising: a processor resource, and a non-transitory memory resource storing machine-readable instructions stored thereon that, when executed, cause the processor resource to generate a machine learning dataset, train and deploy a classifier using the machine learning dataset to determine whether a machine learning training process is running on a first computing device and whether the machine learning training process is malicious or is not malicious, and send an alert to the first computing device based on results of the trained classifier deployment on the first computing device.

15 Claims, 5 Drawing Sheets

(56) References Cited

U.S. PATENT DOCUMENTS

| | | | | |
|---|---|---|---|---|
| 2018/0039779 | A1* | 2/2018 | Li | G06F 21/56 |
| 2019/0147371 | A1* | 5/2019 | Deo | G06N 20/00 706/12 |
| 2020/0082097 | A1* | 3/2020 | Poliakov | G06F 21/577 |
| 2022/0083659 | A1* | 3/2022 | Ma | G06N 20/20 |
| 2022/0114260 | A1* | 4/2022 | Udupi Raghavendra | G06F 21/566 |
| 2022/0172111 | A1* | 6/2022 | Gao | G06N 20/00 |
| 2023/0409715 | A1* | 12/2023 | Nissim | G06F 9/45533 |
| 2024/0129327 | A1* | 4/2024 | Meir | G06F 21/552 |

* cited by examiner

MACHINE LEARNING PROCESS DETECTION

BACKGROUND

Machine learning is the study of computing device processes that improve without human intervention through experience and using data. Machine learning can be a part of artificial intelligence. Machine learning processes build a model based on sample data, known as "training data", in order to make predictions or decisions without being explicitly programmed to do so.

DETAILED DESCRIPTION

Figure 1:
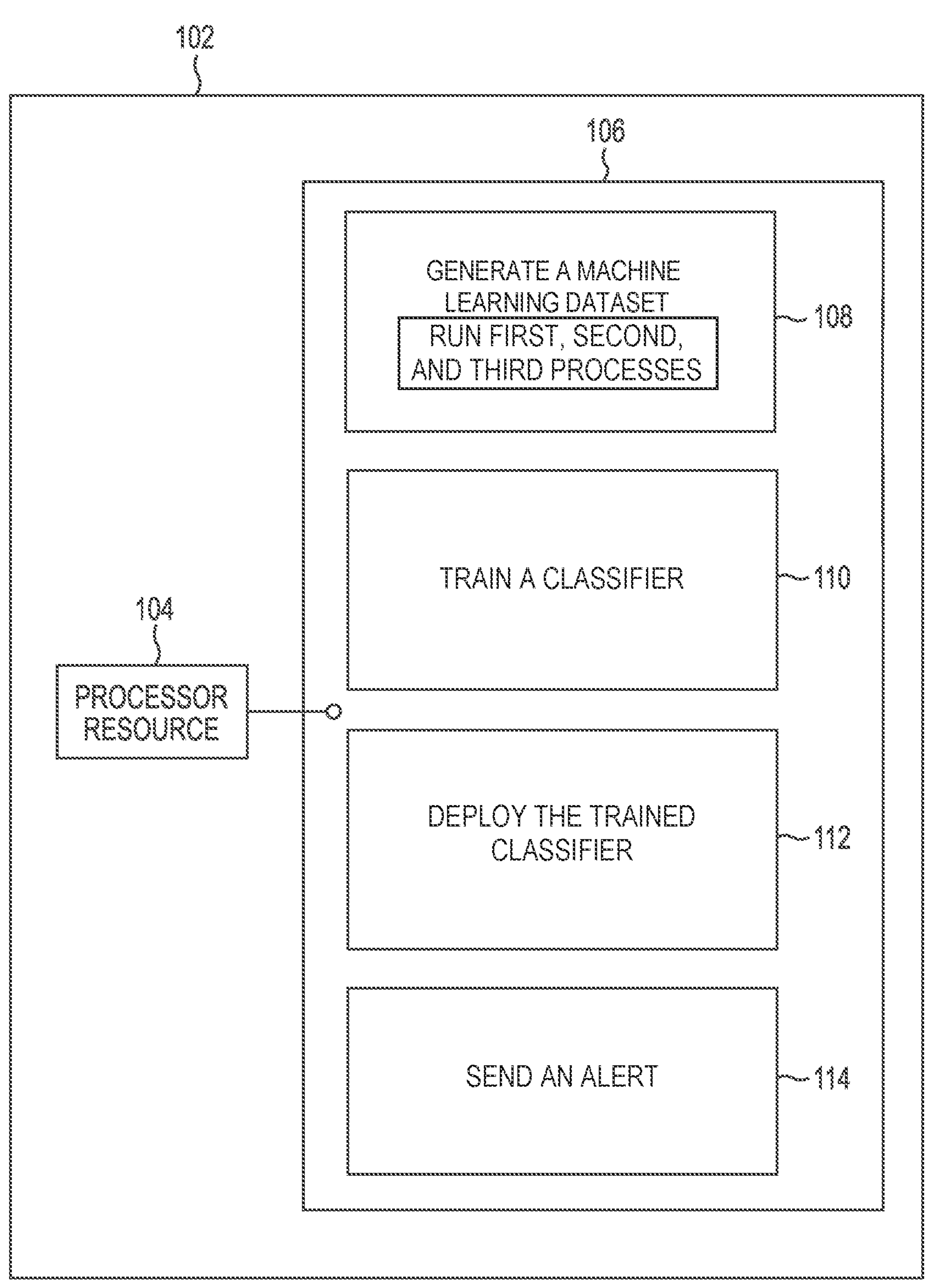
FIG. 1 illustrates an example of a device for detecting a machine learning process consistent with this disclosure.

Antivirus programs can include computer programs to prevent, detect, and remove malicious programs designed to disrupt, damage, and/or gain unauthorized access to a computing device. As used herein, the term computing device refers to an electronic system having a processor resource and a memory resource. Examples of computing devices can include, for instance, a laptop computer, a notebook computer, a desktop computer, controller, and/or a mobile device (e.g., a smart phone, tablet, personal digital assistant, etc.), among other types of computing devices.

Some approaches to detecting and determining malicious actors (e.g., computer programs) include utilizing antivirus programs to sense processes and stop or "kill" the process before the process can harm the computing device and/or a system of computing devices. However, such examples do not address machine learning training processes as a method to maliciously steal data or otherwise harm a computing device or computing system.

In contrast, examples of the present disclosure detect machine learning processes, whether malicious or not malicious, while it is running on a computing device. Examples can reduce and/or prevent data leaks and alert or stop users from using malicious training source code to leak data (knowingly or unknowingly). Examples of the present disclosure can detect malicious actions using simulated data as input, raw data as input, or both.

Machine learning processes (e.g., machine learning models) learn from data, including training data. The processes can determine relationships, develop understanding, make decisions, and evaluate their confidence from training data. Training data can be labeled or unlabeled, with supervised learning using labeled data (e.g., annotated to show a target outcome) to teach a device how to recognize outcomes the machine learning model is designed to detect, and unsupervised learning using unlabeled data to find patterns in the data, such as inferences or clustering of data points. Hybrid approaches may include a combination of supervised and unsupervised learning.

A first example machine learning process training approach includes splitting training between a cloud service and the computing device. Such an approach allows for data to remain at the computing device and avoids sending data to the cloud service. In such examples, a plurality of computing devices may be available, and in each training round, a sample of device can be selected, with each one tuning the machine learning model locally and uploading it to the cloud service. The cloud service can aggregate the updates and build a new machine learning model version. This example can be referred to as distributed learning.

Another example includes training running in a computing device that owns the data, but a final machine learning model is shared publicly on the Internet, available for download and use. This example can be referred to as local training. Other training approaches (e.g., machine-learning-as-a-service, edge deployment training, etc.) may be used in some examples.

Training code may be used in an attack to access data (e.g., intellectual property data) stored on a computing device that may use the training code. The training code can be installed and run on the computing device, becoming trusted training code. The now-trusted training code can then be used to attack a machine learning model. Examples of the present disclosure can detect malicious training code. A first example may not have access to the training code but detects execution of the training code through external metrics of an operating system process, and a second example may have access to the raw training source code.

FIG. 1 illustrates an example of a device 102 for detecting a machine learning process. The device 102, in some instances, does not have access to training code. In some examples, the device 102 can include a processor resource 104 communicatively coupled to a memory resource 106. "Communicatively coupled," as used herein, can include coupled via various wired and/or wireless connections between devices such that data can be transferred in various directions between the devices. The coupling may not be a direct connection, and in some examples can be an indirect connection.

As described further herein, the memory resource 106 can include instructions 108, 110, 112, 114 that can be executed by the processor resource 104 to perform particular functions. In some examples, the device 102 can be utilized to interact with other computing devices. In some examples, the device 102 can be coupled to a microphone, imaging device (e.g., camera, video camera, etc.), and/or display device (e.g., monitor, etc.). In these examples, the device 102 can capture image data utilizing the imaging device, capture audio data utilizing the microphone, and/or display images utilizing the display device.

The device 102 can be a computing device that can include components such as a processor resource 104. As used herein, the processor resource 104 can include, but is not limited to: a central processing unit (CPU), an application specific integrated circuit (ASIC), a field programmable gate array (FPGA), a metal-programmable cell array (MPGA), a semiconductor-based microprocessor, or other combination of circuitry and/or logic to orchestrate execution of instructions 108, 110, 112, 114. In other examples, the device 102 can include instructions 108, 110, 112, 114, stored on a machine-readable medium (e.g., memory resource 106, non-transitory computer-readable medium, etc.) and executable by a processor resource 104. In a specific example, the device 102 utilizes a non-transitory computer-readable medium storing instructions 108, 110, 112, 114, that, when executed, cause the processor resource 104 to perform corresponding functions. In some examples, the device 102 can include instructions 108 to generate a machine learning dataset. The generation can include, for instance, the processor resource to run a first process and collect a first subset of the machine learning dataset, run a second process and collect a second subset of the machine learning dataset, and run a third process and collect a third subset of the machine learning dataset. The first, the second, and the third processes can be run on a dataset generated using input data including images, text, audio, video, etc.

The first process, for instance, can generate process metrics associated with a non-machine learning process. The second process can generate process metrics associated with a malicious machine learning process, and the third process can generate process metrics associated with a non-malicious machine learning process. In some examples, the processes generate process metrics associated with a particular type of machine learning process (e.g., facial recognition).

For instance, the dataset generation can be semi-automatic such that the data is generated and captured through the aforementioned rounds of processes. In each round, a process can be run, and data can be collected. In some examples, a non-machine learning process can be run, and sample processes can be randomly sampled to run from a set of applications such as browsers, remote meeting tools, and/or productivity tools, among others. The machine learning process metrics used to generate the dataset can include, for instance classification models, regression models, ranking models, computer vision models, natural language processing models, deep learning models, etc. For the processes, variables can be considered when determining how to sample the data. The variables can include, for instance, a training type (e.g., distributed vs. local), a training code (e.g., malicious vs. non-malicious), and an input dataset.

Put another way, the processes can be run by sampling processes to run from a set of applications based on a training type of the process, a training code of the process, a particular dataset input into the process, or a combination thereof. The training type, for instance, may be a distributed training type or a local training type. The training code may be a malicious training code or a non-malicious training code.

The training processes can be launched, and data can be generated (e.g., captured) during the rounds. For instance, generated data can include resource consumption (e.g., load on processor resource(s)), persistent and non-persistent memory, etc.), operating system resource consumption and energy states (e.g., battery, etc.), process binary/executable file information (e.g., size, name, number of sub-processes and threads, etc.), training process information (e.g., level of privilege, etc.), files being read by the training process (e.g., size, name, type, etc.), network access, communication with other services, and/or time-related data (e.g., hour, day, day of week, etc.), among other data. Dynamic data can be sampled periodically (e.g., every X milliseconds), while static data can be sampled once.

The device 102, can include instructions 110 and 112 to train and deploy a classifier using the machine learning dataset (e.g., the data/metrics generated during the rounds) to determine whether a machine learning training process is running on a computing device, and whether the machine learning training process is malicious or is not malicious. For instance, if the machine learning training process is not running on the computing device, a determination of its maliciousness or lack thereof may not be made. In contrast, if the machine learning training process is running on the computing device, a determination of its maliciousness or lack thereof may be made.

In some examples, the classifier can execute on the computing device (e.g., silently on the computing device) periodically (e.g., every X seconds, minutes, hours, days, etc.), and external measures can be extracted from processing running on the computing device. When a machine learning training processes is flagged as potentially malicious, an alert can be sent. For instance, at 114, the device 102 can include instructions to send an alert to the computing device based on results of the trained classifier deployment on the computing device.

In some examples, the processor resource 104 can deploy the trained classifier on a different computing device and send the alert to the different computing device based on results of the trained classifier deployment on the second computing device. For example, upon learning the machine learning training process is running on the first computing device, a user may choose to deploy the classifier on another device to learn if the machine learning training process is running on that device. For instance, the device 102 can include the instructions 114 to send an alert to a computing device (e.g., a third computing device) associated with an authorized user in response to determining the machine learning training process is running, is malicious, or both.

The machine learning training process can be stopped or maintained for further inspection in response to the running determination, the malicious determination, or both, whether on the first computing device, the second computing device, or both. When a determination is made that the machine learning training process is running but is not malicious, the device 102 can instruction the associated computing device to continue to run the machine learning process. When a determination is made that the machine learning training process is not running on the computing device, the computing device can be instructed to continue with present functioning. The classifier can continue to execute on the computing device, for instance, until a determination is made that a machine learning training process is running on the computing device, is malicious, and/or another stop point is reached.

In some instances, the machine learning training process runs inside a network of computing devices, and the processor resource is to run the first round, the second round, and the third round on a computing device or a subset of computing devices within the network of computing devices. When running inside the network of computing device, other devices can be automatically (e.g., without additional user input) notified to check whether a training process with similar characteristics is running thereon. For instance, the alert can be sent to each computing device in the network of computing devices in response to determining the machine learning training process on at least one of the computing devices in the network of computing devices is malicious.

Put another way, the processor resource can determine, based on deployment of the trained classifier, that the machine learning training process is running on the computing device, determine the computing device is part of a network of computing devices, and send an alert to each computing device in the network of computing devices that the machine learning training process is running on the computing device. Similar, the processor resource can determine, based on deployment of the trained classifier, that the machine learning training process is running on the computing device and that the machine learning training process is malicious, determine the computing device is part of a network of computing devices, and send an alert to each computing device in the network of computing devices that the machine learning training process is running on the computing device and is malicious.

Figure 2:
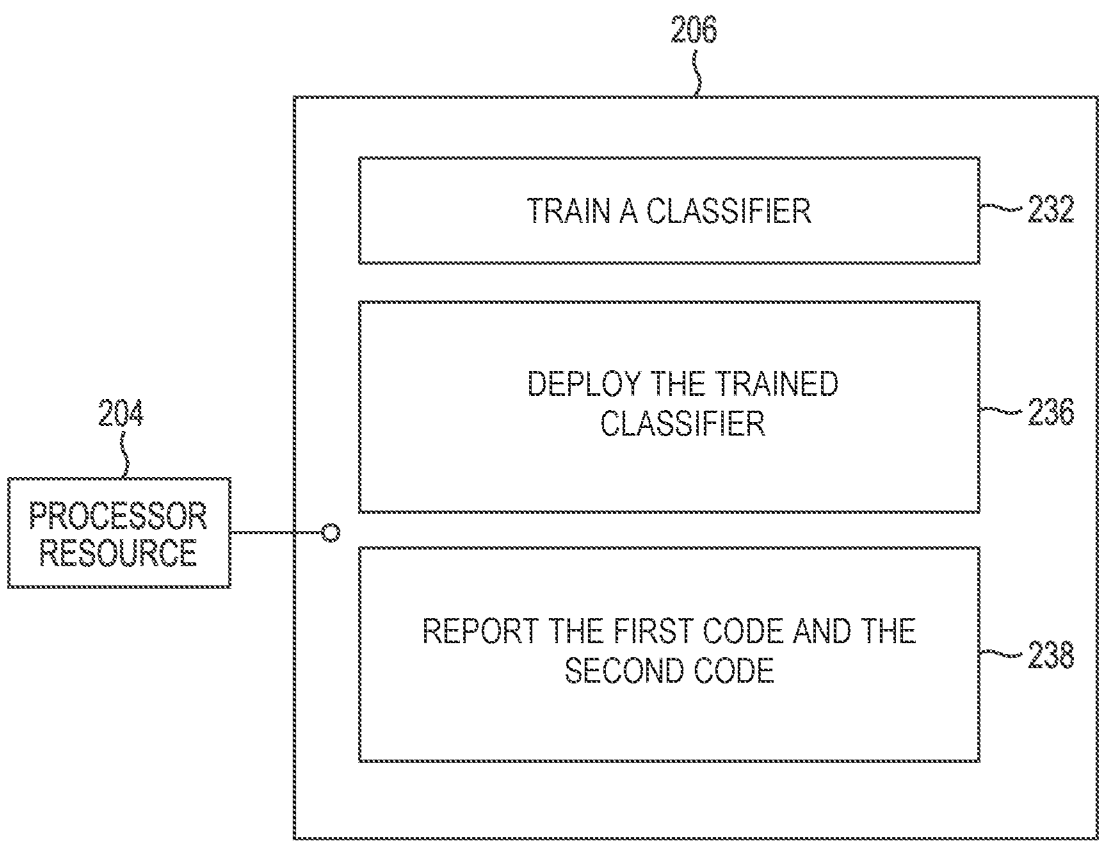
FIG. 2 illustrates an example of a memory resource for detecting a machine learning process consistent with this disclosure.

FIG. 2 illustrates an example of a memory resource 206 for detecting a machine learning process. The memory resource 206, in some instances, has access to raw training source code. In some examples, the memory resource 206 can be a part of a computing device or controller that can be communicatively coupled to a system. For example, the memory resource 206 can be part of a device 102 as referenced in FIG. 1. In some examples, the memory resource 206 can be communicatively coupled to a processor resource 204 that can execute instructions 232, 234, 236 stored on the memory resource 206. For example, the memory resource 206 can be communicatively coupled to the processor resource 204 through a communication path. In some examples, a communication path can include a wired or wireless connection that can allow communication between devices and/or components within a device or system.

The memory resource 206 may be electronic, magnetic, optical, or other physical storage device that stores executable instructions. Thus, a non-transitory machine-readable medium (MRM) (e.g., a memory resource 206) may be, for example, a non-transitory MRM comprising Random-Access Memory (RAM), read-only memory (ROM), an Electrically-Erasable Programmable ROM (EEPROM), a storage drive, an optical disc, and the like. The non-transitory machine-readable medium (e.g., a memory resource 206) may be disposed within a controller and/or computing device. In this example, the executable instructions 232, 234, 236 can be “installed” on the device. In some examples, the non-transitory machine-readable medium (e.g., a memory resource) can be a portable, external or remote storage medium, for example, that allows a computing system to download the instructions 232, 234, 236 from the portable/external/remote storage medium. In this situation, the executable instructions may be part of an ‘installation package’. As described herein, the non-transitory machine-readable medium (e.g., a memory resource 206) can be encoded with executable instructions for performing calculations or computing processes.

The memory resource 206 and the processor resource 204 can work as a static code analyzer tool trained to detect bad (e.g., malicious) practices while training machine learning models. The machine learning models can be trained to map input data into one of two classes: malicious training code or non-malicious training code. In some examples, following training, the machine learning model can be embedded in packages to be used as extensions and/or plugins and may be available on-demand. For instance, in some examples, the processor resource 204 can embed the trained classifier into the computing device associated with the authorized user or a different computing device using an integrated development environment (IDE) package. In some instances, the trained machine learning model can be embedded against a set of files.

The instructions 232, when executed by a processor resource such as the processor resource 204, can include instructions to train, using malicious training source code and non-malicious training source code, a classifier to determine whether a machine learning process running on a computing device is malicious. In some examples the training source code can include raw input data such as training source code from source code libraries or other Internet sources. The raw input data in some instances can include training source code containing data pre-processing methods (e.g., data obfuscation, local differential privacy libraries, etc.), machine learning model types (e.g., neural nets, tree-based, etc.), and/or machine learning model hyper-parameters (e.g., number of epochs, learning rate, etc.), among others. In some examples, a machine learning model checkpoint can be created as a fault tolerance technique and can be filed with descriptive information about the machine learning model after training. The checkpoint, for instance, can include a final number of epochs, a batch size, and internal parameters such as weights of a neural network.

The instructions 234, when executed by a processor resource such as the processor resource 204, can include instructions to deploy the trained classifier on the computing device. The deployment can be done to determine a first code running on the computing device is malicious, and to determine a second code running on the computing device is not malicious. Put another way, the processor resource 204 can map the first code as malicious training code and/or map the second code as non-malicious training code. In some instances, the first code and the second code are different portions of a same code.

In some examples, a natural language processing model can be used in determining whether code is malicious or non-malicious. For instance, the natural language processing model can be trained to distinguish between malicious and non-malicious training codes. The natural language processing model can include a transformer-based model, for instance, and/or other models that can address sentences, and paragraphs. The natural language processing model can highlight words, subwords, etc. in raw input data based on an importance classification assigned to the word, subword, etc.

The instructions 236, when executed by a processor resource such as the processor resource 204, can include instructions to report the first code as malicious and the second code as not malicious to the computing device associated with an authorized user. For instance, the report can include a likelihood of portions of the first and/or second code and/or raw input data are malicious or non-malicious, as well as associated words or subwords as source code highlights indicating these likelihoods. In some examples, the processor resource can rank items in the first code and the second code based on a determined relevance to the malicious determination, the non-malicious determination, or both. For instance, particular text in the first or the second code may be turned red for a highest risk and blue for a lowest risk. Some examples can include other ranking and highlighting approaches.

Figure 3:
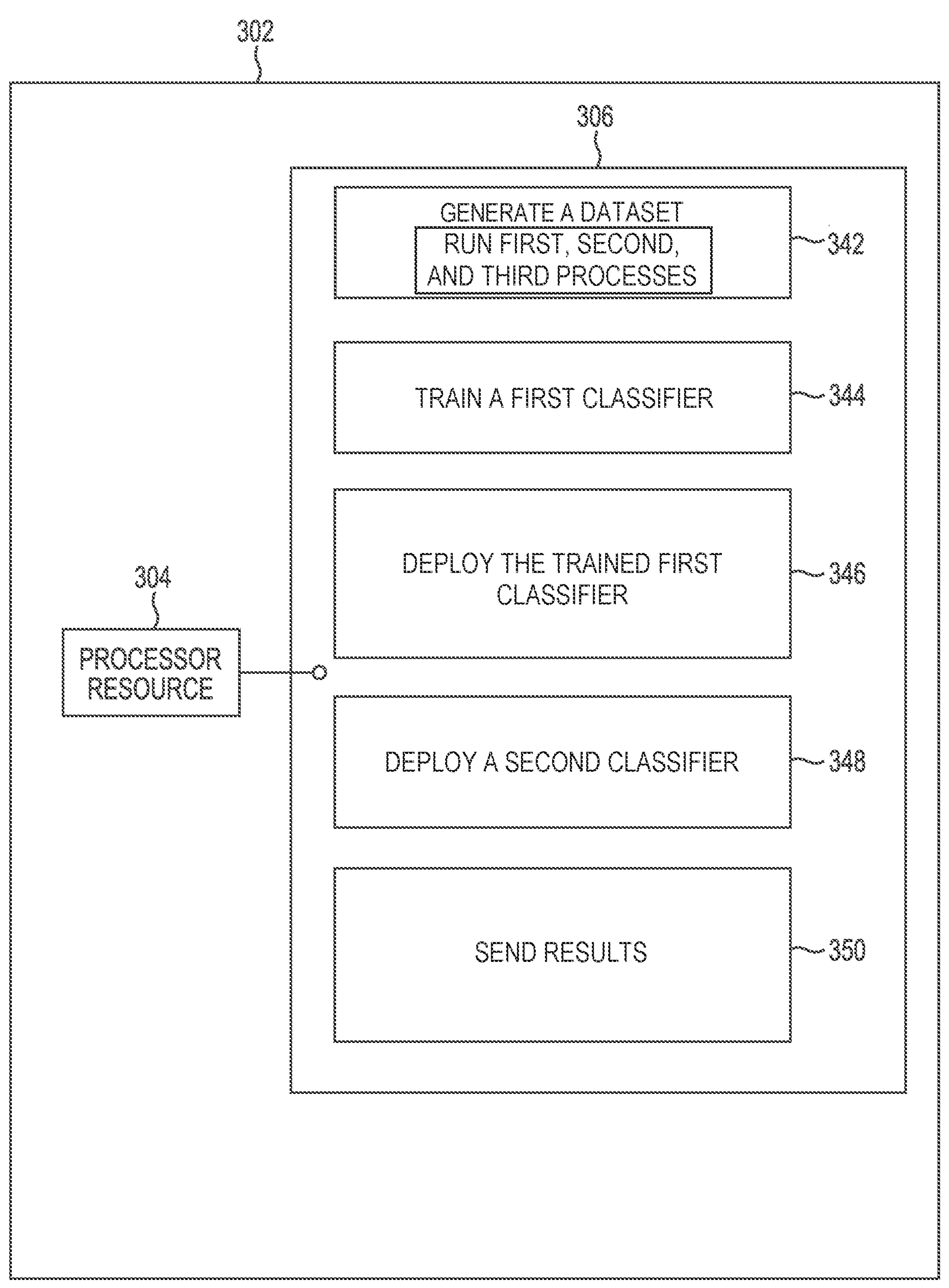
FIG. 3 illustrates another example of a device for detecting a machine learning process consistent with this disclosure.

FIG. 3 illustrates another example of a device 302 for detecting a machine learning process. In some examples, the device 302 can be a computing device or controller that includes a processor resource 304 communicatively coupled to a memory resource 306. Device 302, in some examples, may be analogous to device 102 described with respect to FIG. 1, the processor resource 304 may be analogous to the processor resources 104 and 204 described with respect to FIGS. 1 and 2, and the memory resource 306 may be analogous to the memory resources 106 and 206 described with respect to FIGS. 1 and 2. As described herein, the memory resource 306 can include or store instructions 342, 344, 346, 348, 350 that can be executed by the processor resource 304 to perform particular functions.

The device 302 can facilitate the detection of malicious training described with respect to FIG. 1 in addition to the detection of malicious training as described with respect to FIG. 2. For instance, the examples associated with FIGS. 1 and 2 can be run in conjunction such that a notification is received of a potentially malicious training process (e.g., via distributed training), and a second level of detection may be run at a local level. For example, a user may learn, using a first trained classifier, that his or her device is running a machine learning training process and/or a computing device on a common network is running a machine learning training process and may choose to deploy a second classifier to determine if code running on his or her computing device is malicious.

In some examples, the device 302 can include instructions 342 that can be executed by a processor resource 304 to generate a dataset. The generation, for example, can include running a first process and collecting a first subset of the dataset, running a second process and collecting a second subset of the dataset, and running a third process and collecting a third subset of the dataset. For instance, the dataset generation can be semi-automatic such that the data is generated and captured through the aforementioned rounds. In each round, a process can be run, and data can be collected. The process can be a non-machine learning process, a machine learning process, or a combination thereof.

In some examples, the device 302 can include instructions 344 that can be executed by a processor resource 304 to train a first classifier using the dataset to determine whether a machine learning training process is running on a computing device, and the device 302 can include instructions 346 that can be executed by a processor resource 304 to deploy the trained first classifier on the computing device. The first classifier, for instance, can be used to determine if a machine learning training process is running on the computing device.

The device 302, in response to determining the machine learning training process running on the computing device is malicious, can include instructions 348 to deploy a second classifier trained using malicious training source code and non-malicious training source code, to scan code running on the computing device and determine what portion of the code is malicious, and the device 302 can include instructions 350 to send results of the scan to the computing device or a different computing device.

In some examples, the device can include instructions to send an alert to the computing device running a malicious machine learning training process in response to determining the machine learning training process is malicious. For instance, a user may receive a notification of a potentially malicious machine learning training process. The user may determine it is the same as his or her own training process and choose to run a second level of detection. In some instances, the second level of detection can be run without user intervention.

In some examples, the device 302 can include instructions that can be executed by the processor resource 304 to receive input data from the computing device for use in the processes at the computing device. This can be input data associated with the user's training process that is undergoing the second level of detection. This data can be raw data, in some instances, such as the raw text of files as a full document with paragraphs.

Figure 4:
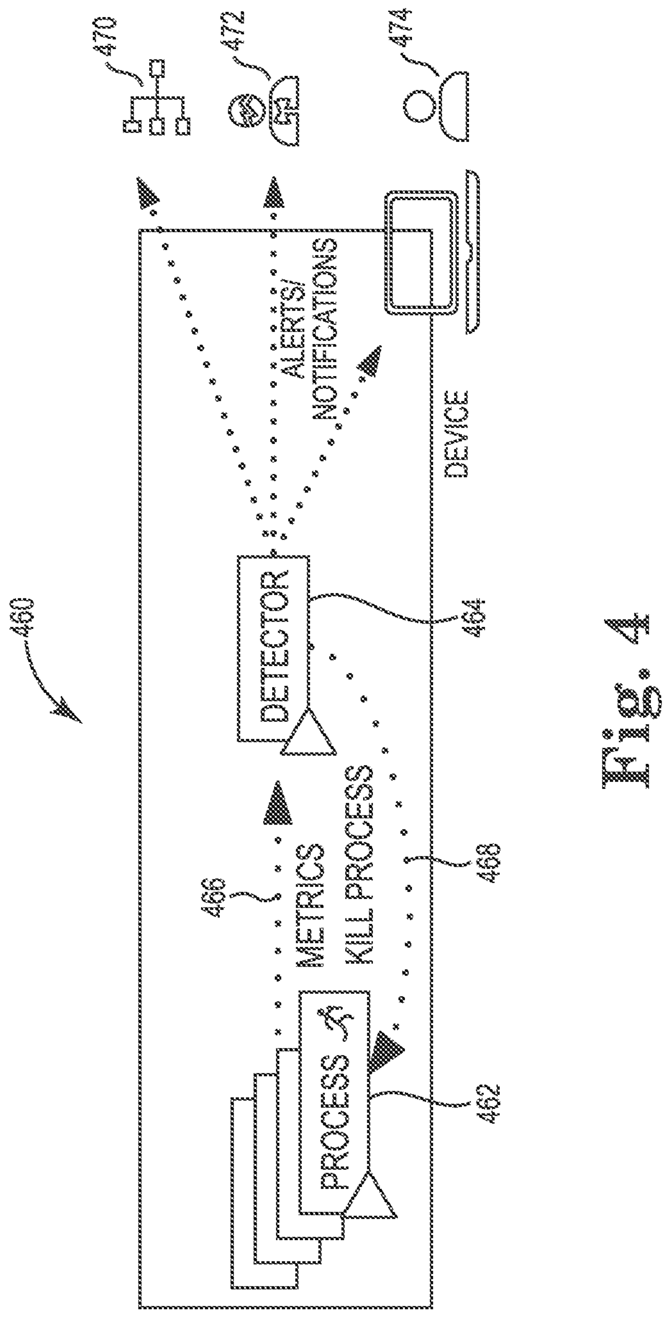
FIG. 4 illustrates an example of a method for detecting a machine learning process consistent with this disclosure.

FIG. 4 illustrates an example of a method 460 detecting a machine learning process. In some examples, the method 460 can illustrate how instructions that can be executed by a processor resource can provide a malicious training process determination as described herein. The detector 464, in some examples, may include a processor resource and memory resource such as those illustrated and described with respect to FIG. 1. In some instances, the detector 464 can be used to detect malicious machine learning training processes on a device given external process information.

A plurality of rounds of processes 462 can be run and used to generate metrics 466, and the metrics 466 can be provided to the detector 464. The detector 464 can periodically execute, in the background (e.g., without interrupting a user), a classifier on a device 474 (e.g., a computing device) looking for new machine learning training processes, and if a new machine learning training process is detected, determining if the machine learning training process is malicious. In some instances, the execution can be managed by a third-party cloud service, and external measures can be extracted from the processes 462 running on the device 474.

When the detector 464 determines a machine learning training process is running on the computing device 474, a user associated with the computing device 474, an information technology manager or other authorized user 472, and/or other network users/devices 470 can be notified and alerted of the machine learning training process and whether or not it is potentially malicious. For instance, when running inside a network with multiple devices, the detector 464 can automatically notify other devices 470 to check whether a process with similar characteristics is running there. In some instances, the potentially malicious machine learning training process can be permanently or temporarily stopped or "killed" at 468. More rounds processes may be run at 462 to further train a classifier associated with the detector 464.

In a non-limiting example, machine learning models can be used with magnetic resonance imaging (MRI) to diagnose ailments. MRI images can include private data that a patient expects is protected. Health care providers may access databases of MRI images that are being targeted by malicious training. The detector 464 can utilize a classifier trained using the metrics 466, and in response to detecting a machine learning training process running on the computing device with access to the private data, the detector 464 can stop the machine learning training process (whether malicious or not) (e.g., at 468), send a notification to authorized users 472 and devices 474, 470, and check the malicious machine learning training process against similar processes to which the detector 464 has access.

Figure 5:
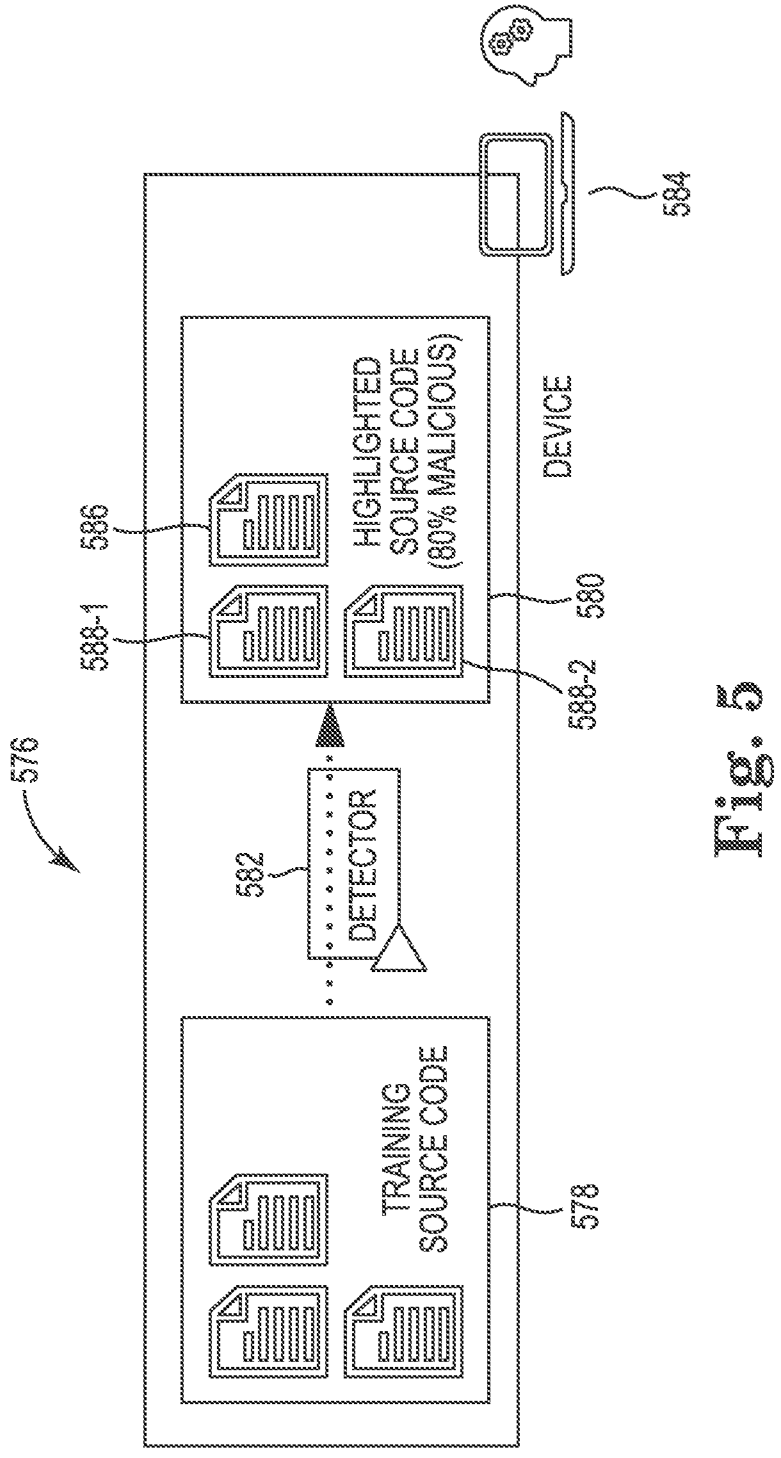
FIG. 5 illustrates another example of a method for detecting a machine learning process consistent with this disclosure.

FIG. 5 illustrates another example of a method 576 for detecting a machine learning process. In some examples, the method 576 can illustrate how instructions that can be executed by a processor resource can detect a machine learning training process as described herein. The detector 582, in some examples, may include a processor resource and memory resource such as those illustrated and described with respect to FIG. 3. The method 576, can be static, in some instances, and can be used on local source training code. In some examples, the detector 464 can be used to detect malicious model source code being run with explainable code highlights.

The detector 582 can execute as a plug-in/extension over a set of source code filed and model outputs from training source code 578. For instance, a classifier used by the detector 582 can be trained using training source code 578 (e.g., malicious training source code and non-malicious training source code) to determine whether a machine learning training process is running on a computing device. The training source code 578 can include raw text of files as full documents with paragraphs, and the detector 582 can distinguish between malicious and non-malicious codes. Words in the paragraphs can be highlighted and malicious/non-malicious likelihood determinations can be made. At 580, the detector 582 can output a likelihood (e.g., here 80%) that a particular portion of input data is malicious, as indicated at portions 588-1 and 588-2, or non-malicious, as indicated at portion 586. This output can be an alert to a device 584 (e.g., a computing device on which the machine learning training process is running) or a user associated with the device 584, among others.

In a non-limiting example, a malicious attacker may develop a new natural language processing training model that classifies documents. Users in different locations may download the model and build models using the new natural language processing training model. The users may train with openly available data, while others add their data or train with only private data. A user may silently run locally the detector 582 and be notified that the training process may be malicious, leaking private information through the new natural language processing training model. The user may further scan the training source code 578 with the detector 582 and receive an output 580 with highlighted source code that is likely malicious.

The figures herein follow a numbering convention in which the first digit corresponds to the drawing figure number and the remaining digits identify an element or component in the drawing. For example, reference numeral 102 may refer to element 102 in FIG. 1 and an analogous element may be identified by reference numeral 302 in FIG. 3. Elements shown in the various figures herein can be added, exchanged, and/or eliminated to provide additional examples of the disclosure. In addition, the proportion and the relative scale of the elements provided in the figures are intended to illustrate the examples of the disclosure and should not be taken in a limiting sense.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples, and data provide a description of the system and method of the disclosure. Since many examples can be made without departing from the spirit and scope of the system and method of the disclosure, this specification merely sets forth some of the many possible example configurations and implementations.

What is claimed is:

1. A device, comprising:

a processor resource; and a non-transitory memory resource storing machine-readable instructions stored thereon that, when executed, cause the processor resource to:

generate a machine learning dataset, the generation comprising the processor resource to:

run first process and collect a first subset of the machine learning dataset;

run a second process and collect a second subset of the machine learning dataset;

run a third process and collect a third subset of the machine learning dataset; and train and deploy a classifier using the machine learning dataset to determine whether a machine learning training process is running on a first computing device, and whether the machine learning training process is malicious or is not malicious; and send an alert to the first computing device based on results of the trained classifier deployment on the first computing device.

2. The device of claim 1, further comprising the processor resource to:

deploy the trained classifier on a second computing device; and send the alert to the second computing device based on results of the trained classifier deployment on the second computing device.

3. The device of claim 2, wherein:

in response to determining the machine learning training process running on the first computing device, the second computing device, or both is malicious, the processor is to send an alert to the first computing device, the second computing device, a third computing device, or a combination thereof; and in response to determining the machine learning training process is not malicious, the processor is to instruct the first computing device, the second computing device, or both to continue to run the machine learning training process.

4. The device of claim 3, further comprising the processor resource to stop the machine learning training process in response to determining the machine learning process training process is malicious.

5. The device of claim 2, further comprising the processor resource to send an alert to the first computing device, the second computing device, or both, that the machine learning training process is running on the first computing device, the second computing device, or both, in response to determining the machine learning process is running on the first computing device, the second computing device, or both.

6. The device of claim 1, wherein the machine learning dataset comprises machine learning process metrics.

7. The device of claim 1, wherein the first process generates process metrics associated with a non-machine learning process, the second process generates process metrics associated with a malicious machine learning process, and the third process generates process metrics associated with a non-malicious machine learning process.

8. The device of claim 1, wherein the processor resource is to:

determine that the machine learning training process is running on the first computing device;

determine the first computing device is part of a network of computing devices; and send an alert to each computing device in the network of computing devices that the machine learning training process is running on the first computing device.

9. The device of claim 1, wherein the processor resource is to:

determine that the machine learning training process is running on the first computing device and that the machine learning training process is malicious;

determine the first computing device is part of a network of computing devices; and send an alert to each computing device in the network of computing devices that the machine learning training process is running on the first computing device and is malicious.

10. A non-transitory memory resource storing machine-readable instructions stored thereon that, when executed, cause a processor resource to:

generate a dataset, the generation comprising the processor resource to:

run first process and collect a first subset of the dataset;

run a second process and collect a second subset of the dataset;

run a third process and collect a third subset of dataset; and train, using the dataset, a classifier to determine whether a machine learning process running on a computing device is malicious;

deploy the trained classifier on the computing device to:

determine a first code running on the computing device is malicious;

determine a second code running on the computing device is not malicious; and report the first code as malicious and the second code as not malicious to the computing device.

11. The non-transitory memory resource of claim 10, wherein the processor resource is to embed the trained classifier into the computing device or a different computing device using an integrated development environment (IDE) package.

12. The non-transitory memory resource of claim 11, wherein the processor resource is to rank items in the first code and the second code based on a determined relevance to the malicious determination, the non-malicious determination, or both.

13. A device, comprising:

a processor resources; and a non-transitory memory resource storing machine-readable instructions stored thereon that, when executed, cause the processor resource to:

generate a dataset, the generation comprising the processor resource to:

run a first process and collect a first subset of the dataset;

run a second process and collect a second subset of the dataset; and run a third process and collect a third subset of the dataset;

train a first classifier using the dataset to determine whether a machine learning training process is running on a computing device;

deploy the trained first classifier on the computing device;

in response to determining the machine learning training process running on the computing device is malicious, deploy a second classifier trained using malicious training source code and non-malicious training source code, to scan code running on the computing device and determine what portion of the code is malicious; and send results of the scan to the computing device.

14. The device of claim 13, wherein the processor resource is to send the results of the scan to a different computing device.

15. The device of claim 13, wherein the first process is a non-machine learning process, and the second process and the third process are machine-learning processes.

* * * * *